US009701205B2

(12) United States Patent
Bosco et al.

(10) Patent No.: US 9,701,205 B2
(45) Date of Patent: Jul. 11, 2017

(54) POWER CUT OFF DEVICE

(71) Applicant: GM GLOBAL TECHNOLOGY OPERATIONS LLC, Detroit, MI (US)

(72) Inventors: Anthony A. Bosco, Macomb, MI (US); Mark C. Graebner, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 14/592,138

(22) Filed: Jan. 8, 2015

(65) Prior Publication Data
US 2016/0200197 A1 Jul. 14, 2016

(51) Int. Cl.
*B60L 3/04* (2006.01)
*B60L 3/00* (2006.01)
*B60L 11/18* (2006.01)

(52) U.S. Cl.
CPC ............... *B60L 3/04* (2013.01); *B60L 3/0007* (2013.01); *B60L 3/0069* (2013.01); *B60L 11/1864* (2013.01); *B60L 2240/14* (2013.01); *Y02T 10/7005* (2013.01); *Y02T 10/7061* (2013.01)

(58) Field of Classification Search
CPC .... B60L 3/04; B60L 1/00; B60L 11/18; B60L 3/00
USPC .............................. 72/384; 307/10.1; 30/233
See application file for complete search history.

(56) References Cited

U.S. PATENT DOCUMENTS

| 3,003,235 A * | 10/1961 | Temple | B23D 15/145 30/180 |
|---|---|---|---|
| 5,535,842 A * | 7/1996 | Richter | B60K 28/14 180/271 |
| 5,990,572 A * | 11/1999 | Yasukuni | H01H 39/006 180/271 |
| 6,754,959 B1 * | 6/2004 | Guiette, III | B23D 15/145 114/221 A |
| 6,843,157 B2 * | 1/2005 | Hamilton | B23D 15/145 200/61.08 |
| 2005/0044923 A1 * | 3/2005 | Bryan | B21D 7/02 72/384 |
| 2010/0078924 A1 * | 4/2010 | Mitsuo | B60R 21/205 280/743.2 |
| 2010/0328014 A1 * | 12/2010 | Suzuki | H01H 9/12 337/30 |
| 2012/0062029 A1 * | 3/2012 | Fukuyama | B60L 3/0007 307/10.1 |

(Continued)

*Primary Examiner* — Jared Fureman
*Assistant Examiner* — Win Htun
(74) *Attorney, Agent, or Firm* — Quinn IP Law

(57) ABSTRACT

A power cut off device includes a case and an actuator disposed in the case. The actuator includes a driver movable relative to the case. Specifically, the driver can move relative to the case between a first driver position and a second driver position. The power cut off device also includes a cutter defining a conductor receiving opening. The cutter is movably disposed in the case. Consequently, the cutter can move relative to the case between a first cutter position and a second cutter position. The cutter is operatively coupled to the actuator such that the driver is configured to drive the cutter from the first cutter position to the second cutter position when the driver moves from the first driver position to the second driver position in order to cut an electrical conductor disposed in the conductor receiving opening.

19 Claims, 3 Drawing Sheets

(56) References Cited

U.S. PATENT DOCUMENTS

2015/0255975 A1* 9/2015 Siciak .................... B60R 16/02
307/9.1
2016/0176294 A1* 6/2016 Kato .................... B60L 3/0007
307/10.1

* cited by examiner

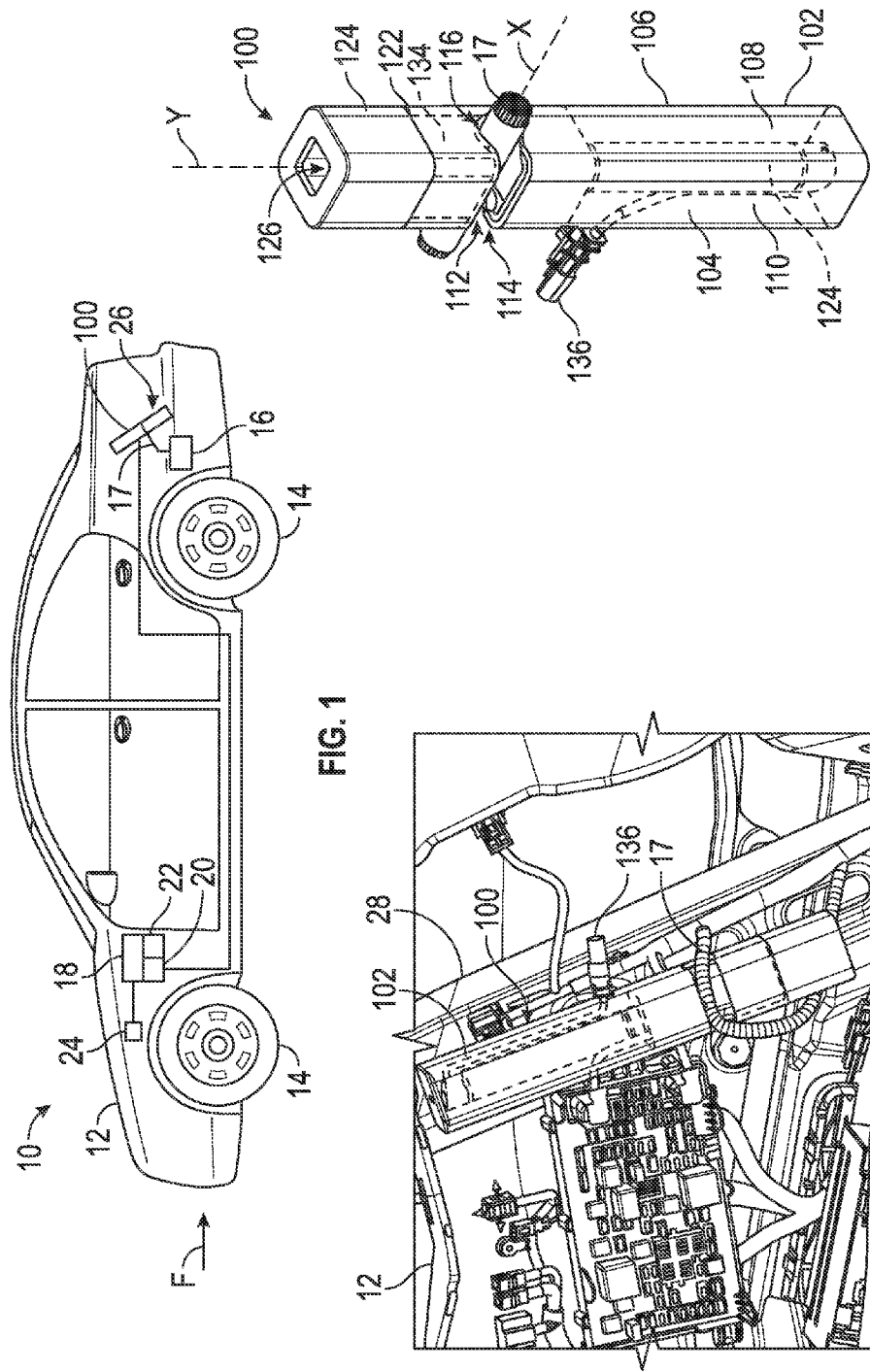

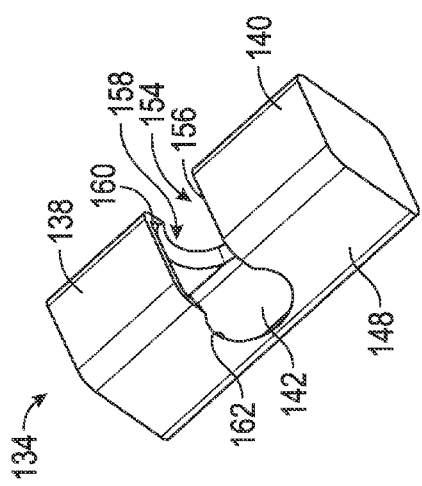
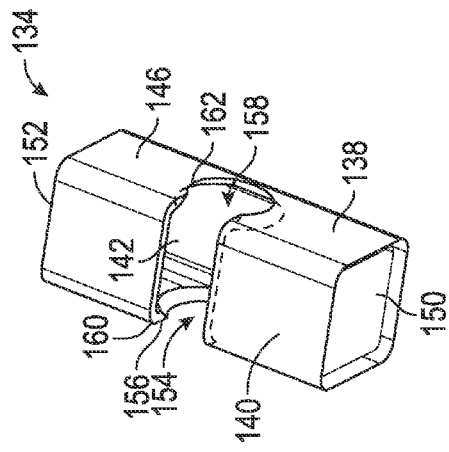
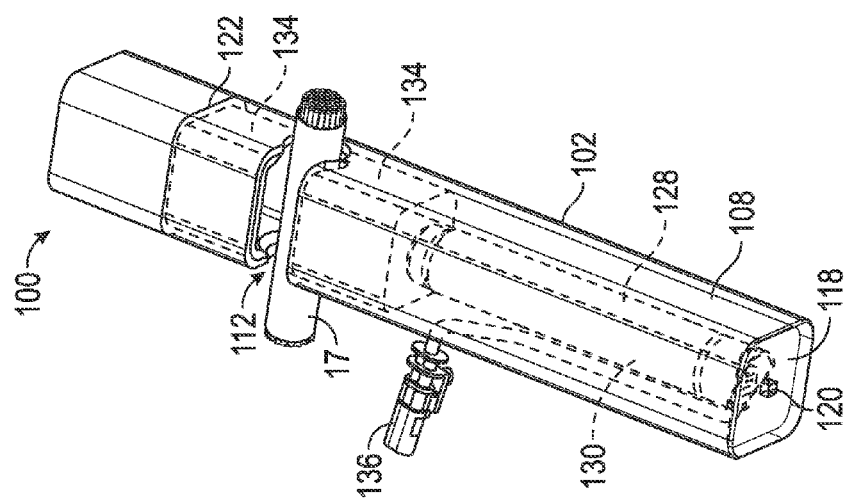

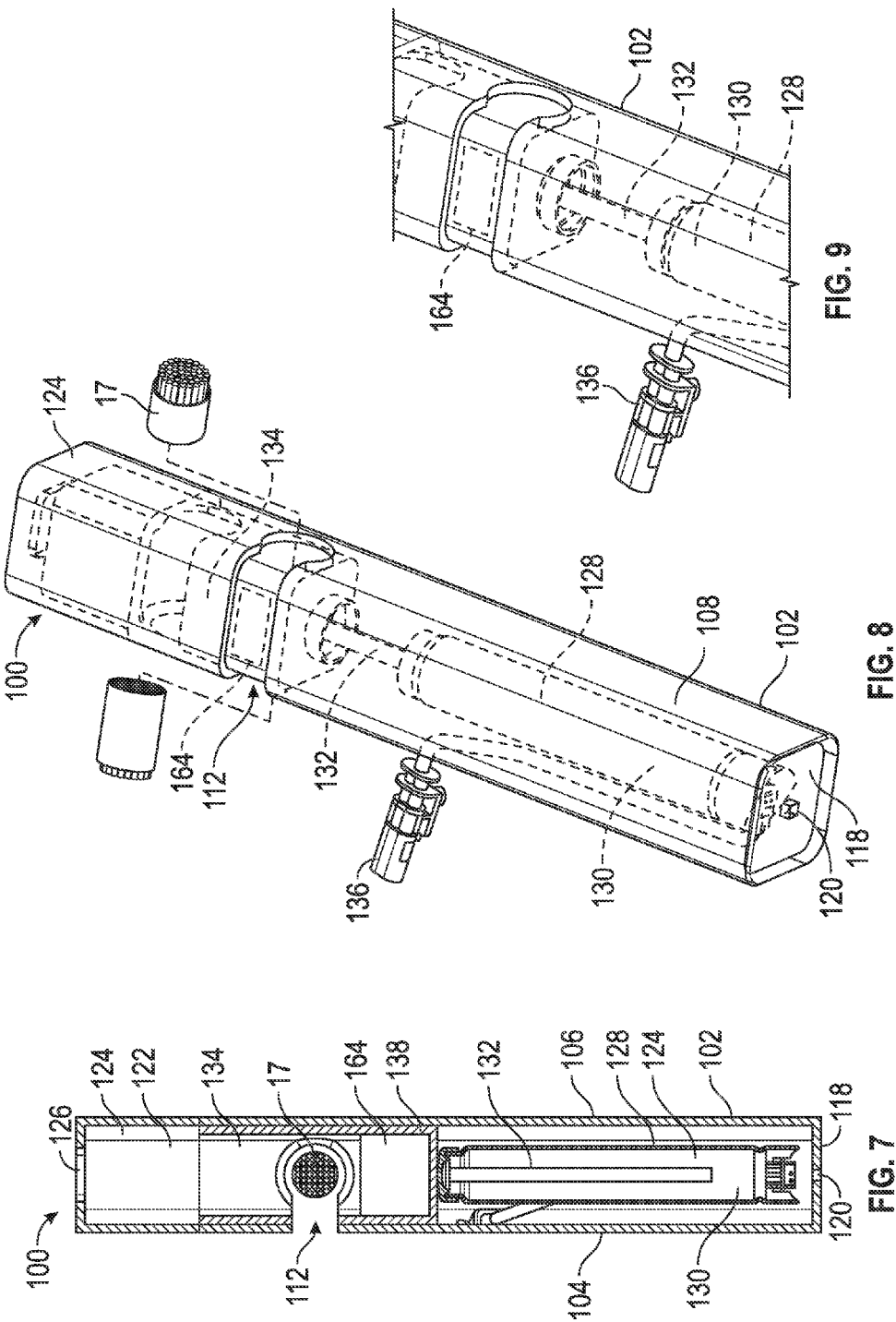

POWER CUT OFF DEVICE

TECHNICAL FIELD

The present disclosure relates to a power cut off device for cutting the electrical power of the vehicle during or after an external force is applied to the vehicle.

BACKGROUND

Many vehicles include a power supply, such as a battery or battery pack. The power supply can help power vehicle components, such as the radio. In hybrid or electric vehicles, the power supply also helps propel the vehicle. In another example, the power supply can be electrically connected to an airbag deployment system. As such, the power supply can provide an electric charge to the airbag deployment system to allow the airbag to deploy.

SUMMARY

The presently disclosed power cut off device can cut off power from a power supply of a vehicle after the vehicle has been subjected to an external force in order to disable systems powered by the power supply. For example, the presently disclosed power cut off device can cut off electrical power in order to disable the airbag deployment system after the vehicle has been subjected to an external force, thereby preventing airbag deployment while first responders are working inside the passenger compartment of the vehicle.

In an embodiment, the power cut off device includes a case and an actuator disposed in the case. The actuator includes a driver movable relative to the case. Specifically, the driver can move relative to the case between a first driver position and a second driver position. The power cut off device also includes a cutter defining a conductor receiving opening. The cutter is movably disposed in the case. Consequently, the cutter can move relative to the case between a first cutter position and a second cutter position. The cutter is operatively coupled to the actuator such that the driver is configured to drive the cutter from the first cutter position to the second cutter position when the driver moves from the first driver position to the second driver position in order to cut an electrical conductor disposed in the conductor receiving opening.

The present disclosure also relates to a power cut off system including the power cut off device described above. In addition to the power cut off device, the power cut off system includes a sensing diagnostic module (SDM) and a sensor in electronic communication with the SDM. The sensor may be a g-force sensor or a deceleration sensor and can send an activation signal to the SDM when an external force has been applied to the vehicle. The SDM can generate an actuation signal upon receipt of the activation signal from the sensor. Furthermore, the SDM can send this actuation signal to the power cut off device and, in response, the driver of the actuator drives the cutter from the first cutter position to the second cutter position. As the cutter moves from the first cutter position toward the second cutter position, the cutter severs the electrical conductor disposed in the conductor receiving opening of the case. The present disclosure also relates to vehicles including the power cut off system described above.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic side view of a vehicle;

FIG. 2 is a schematic perspective view of an inner portion of the vehicle, depicting a power cut off device;

FIG. 3 is a schematic perspective view of the power cut off device shown in FIG. 2, depicting a cutter in a first cutter position;

FIG. 4 is another schematic perspective view of the power cut off device shown in FIG. 2, depicting the cutter in the first cutter position;

FIG. 5 is a schematic perspective view of the cutter of the power cut off device shown in FIG. 2;

FIG. 6 is another schematic perspective view of the cutter of the power cut off device shown in FIG. 2;

FIG. 7 is a schematic, cross-sectional side view of the power cut off device shown in FIG. 2;

FIG. 8 is a schematic perspective view of the power cut off device shown in FIG. 2, depicting the cutter in a second cutter position; and FIG. 9 is a schematic, fragmentary perspective view of the power cut off device shown in FIG. 2, depicting the driver (e.g., push rod) of an actuator.

DETAILED DESCRIPTION

Referring to the drawings, wherein like reference numbers correspond to like or similar components throughout the several figures, and beginning with FIG. 1, a vehicle 10 includes a vehicle body 12 and a plurality of wheels 14 operatively coupled to the vehicle body 12. The vehicle 10 further includes a power supply 16, such as a battery or battery pack, for propulsion and/or for powering vehicle accessories (e.g., navigation system, radio, etc.). The power supply 16 is electrically connected to an electrical conductor 17, such as a wire harness. The electrical conductor 17 can transmit electrical energy from the power supply 16 to other vehicle components. Accordingly, the electrical conductor 17 is at least partly made of an electrically conductive material, such as a metal. In addition to the power supply 16, the vehicle 10 includes a power cut off device 100 configured to sever the electrical conductor 17 in order to cut off electrical power originating from the power supply 16 as discussed in detail below.

The vehicle 10 includes a sensing diagnostic module (SDM) 18 in electronic communication with the power cut off device 100 and configured for, among other things, controlling air bag deployment. "Module," "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed based on events or at regular intervals.

The SDM 18 includes at least one processor 20, such as a microprocessor, and at least one memory 22 in electronic communication with the processor 20. The processor 20 is configured to execute software or firmware programs or routines. The memory 22 is configured to store data (e.g., software or firmware programs or routines). The SDM 18 is in electronic communication with at least one sensor 24 configured to detect whether an external force F has been applied to the vehicle 10. The sensor 24 can be a deceleration sensor configured to measure a deceleration magnitude of the vehicle 10. Alternatively, the sensor 24 can be a g-force sensor configured to measure a g-force acting on the vehicle 10.

The SDM 18 is specifically programmed to receive an activation signal from the sensor 24 when the external force F is applied to the vehicle and generate an actuation signal upon receipt of the activation signal from the sensor 24. Further, the SDM 18 is programmed to send the generated actuation signal to the power cut off device 100 when the SDM 18 receives the activation signal from the sensor 24. If the sensor 24 is a deceleration sensor, the SDM 18 can be specifically programmed to send the actuation signal to the power cut off device 100 when the deceleration magnitude is greater than a deceleration threshold. If the sensor 24 is a g-force sensor, the SDM 18 can be specifically programmed to send the actuation signal to the power cut off device 100 when the g-force acting on the vehicle 10 is greater than a force threshold. The power cut off device 100 may be part of a power cut off system 26 that also includes the SDM 18 and the electrical conductor 17.

With reference to FIG. 2, the power cut off device 100 can be coupled to an inner part 28 of the vehicle body 12. For instance, the power cut off device 100 can be placed in the trunk of the vehicle 10. Regardless of its location, at least a portion of the electrical conductor 17 extends through the power cut off device 100. In other words, the electrical conductor 17 is partially disposed within the power cut off device 100.

With reference to FIGS. 3 and 4, the power cut off device 100 includes a case or housing 102 made of a substantially rigid material in order to support the electrical conductor 17. The case 102 may have a substantially elongated shape and is substantially hollow. In the depicted embodiment, the case 102 may have a substantially square cross-section and includes a first case wall 104, a second case wall 106 opposite the first case wall 104, a third case wall 108 coupled between the first case wall 104 and the second case wall 106, and fourth case wall 110 opposite the third case wall 108. The case 102 extends along a case axis Y and defines an access opening 112 extending through the first case wall 104, the third case wall 108, and the fourth case wall 110 but not the second case wall 106. The access opening 112 extends along an opening axis X, which may be substantially perpendicular to the case axis Y in order to allow the access opening 112 to easily accommodate the electrical conductor 17. The access opening 112 includes a first access portion 114 and a second access portion 116 connected to the first access portion 114. The first access portion 114 is closer to the first case wall 104 than to the second case wall 106 and may have a substantially rectangular cross-section to allow the electrical conductor 17 to be initially inserted in the second access portion 116. The second access portion 116 is closer to the second case wall 106 than to the first case wall 104 and may have a substantially circular cross-section to allow the electrical conductor 17 to rest in the access opening 112.

The case 102 further includes a fifth or bottom case wall 118 (FIG. 4) interconnecting the first case wall 104, the second case wall 106, the third case wall 108, and the fourth case wall 110. The fifth case wall 118 defines an end of the case 102, and a first relief opening 120 extends through the fifth case wall 118. The first relief opening 120 can relieve some pressure inside the case 102. The case 102 also includes a sixth or top case wall 122 defining another end of the case 102. A cap 124 can be coupled to the sixth case wall 122 in order to cover the case 102. The cap 124 has a second relief opening 126 to relieve pressure from inside the case 102.

With reference to FIGS. 4, 7, 8, and 9, the power cut off device 100 includes an actuator 128, which may be entirely disposed inside the case 102 in order to protect it when an external force F is applied to the vehicle 10. The actuator 128 includes an actuator body 130 and a driver 132 (FIG. 9) movably coupled to the actuator body 130. The actuator body 130 is coupled within the case 102. As such, the actuator body 130 remains stationary relative to the case 102. Moreover, the actuator body 130 may be a cylinder, and the driver 132 may be a push rod. The driver 132 can move linearly relative to the actuator body 130 and the case 102 along the case axis Y between a first driver position (FIGS. 4 and 7) and a second driver position (FIGS. 8 and 9). In the depicted embodiment, the actuator 128 is a pyrotechnic actuator that can be electrically activated. In this embodiment, the actuator 128 includes a pyrotechnic igniter capable of driving the driver 132 (e.g., push rod) from the first driver position (FIG. 4) to the second driver position (FIGS. 8 and 9) upon receipt of electrical energy. Specifically, the pyrotechnic igniter may ignite chemical substances contained in the actuator 128 when it receives electrical energy or an actuation signal from the SDM 18.

The power cut off device 100 includes a connector 136 configured to electrically connect the actuator 128 to the SDM 18. Accordingly, SDM 18 is in electronic communication with the actuator 128 via the connector 136, thereby allowing the SDM 18 to send an actuation signal to the actuator 128.

With reference to FIGS. 4, 5, and 6, the power cut off device 100 includes a cutter 134 coupled to the driver 132 of the actuator 128. For example, the driver 132 may be directly coupled to the cutter 134. The actuator 128 is operatively coupled to the cutter 134 and, accordingly, the driver 132 can drive the cutter 134 from the first cutter position (FIG. 4) to the second cutter position (FIG. 8) when the driver 132 moves from the first driver position (FIGS. 4 and 7) to the second driver position (FIGS. 8 and 9). To do so, the cutter 134 is movably disposed inside the case 102. For instance, the entire cutter 134 may be movably disposed inside the case 102 such that the case 102 can serve as a guide for the movement of the cutter 134. In the depicted embodiment, the cutter 134 moves linearly relative to the case 102 along the case axis Y. As a non-limiting example, the case 102 at least partially surrounds the cutter 134 such that the cutter 134 can slide relative to the case 102 along the case axis Y.

With reference to FIGS. 5 and 6, the cutter 134 includes a substantially hollow cutter body 138. The cutter body 138 is substantially hollow to minimize costs and includes a first cutter wall 140, a second cutter wall 142 opposite the first cutter wall 140, a third cutter wall 146 coupled between the first cutter wall 140 and the second cutter wall 142, a fourth cutter wall 148 opposite the third cutter wall 146, a fifth cutter wall 150 interconnecting the first cutter wall 140, the second cutter wall 142, the third cutter wall 146, and the fourth cutter wall 148, and a sixth cutter wall 152 opposite the fifth cutter wall 150. The sixth cutter wall 152 also interconnects the first cutter wall 140, the second cutter wall 142, the third cutter wall 146, and the fourth cutter wall 148.

The cutter 134 has at least one conductor receiving opening 154 configured, shaped, and sized to receive at least one electrical conductor 17. The conductor receiving opening 154 extends through the cutter body 138. In particular, the conductor receiving opening 154 extends through the first cutter wall 140, the third cutter wall 146, and the fourth cutter wall 146 but not through the second cutter wall 142.

The shape and size of the conductor receiving opening 154 of the cutter 134 substantially match the shape and size of the access opening 112 of the case 102 in order to allow the electrical conductor 17 to be placed within the power cut off device 100 when the cutter 134 is in the first cutter position (FIG. 4) with respect to the case 102. Furthermore, the cutter 134 is positioned within the case 102 so that the conductor receiving opening 154 is substantially aligned with the access opening 112 when the cutter 134 is in the first cutter position (FIG. 4) with respect to the case 102.

In the depicted embodiment, the conductor receiving opening 154 includes a first receiving portion 156 and a second receiving portion 158 connected to the first receiving portion 156. The shape and size of the first receiving portion 156 substantially match the shape and size of the first access opening 114 in order to facilitate insertion of the electrical conductor 17 (FIG. 4) into the conductor receiving opening 154 when the cutter 134 is in the first cutter position (FIG. 4). For example, the first receiving portion 156 may have a substantially rectangular cross-section. The first receiving portion 156 is defined by blunt inner surfaces 160 of the cutter body 138. The blunt inner surfaces 160 facilitate insertion of the electrical conductor 17 into the second receiving portion 158 of the conductor receiving opening 154 without damaging the electrical conductor 17.

The shape and size of the second receiving portion 158 substantially match the shape and size of the second access portion 116 in order to allow the electrical conductor 17 to be coupled within the power cut off device 100 when the cutter 134 is in the first cutter position (FIG. 4). For instance, the second receiving portion 158 may have a substantially circular cross-section. Accordingly, the second receiving portion 154 may be referred to as the substantially circular portion. The second receiving portion 158 is defined by sharp cutting edges 162. Accordingly, the cutting edges 162 partially define the conductor receiving opening 154 and are capable of severing the electrical conductor 17 (FIG. 7) when the electrical conductor 17 is disposed in the access opening 112 (FIG. 4) of the case 102 and the cutter 134 moves from the first cutter position (FIG. 4) toward the second cutter position (FIG. 8).

With reference to FIG. 7, the cutter 134 includes an insulator 164, such as an insulator block, disposed within the cutter body 138. The insulator 164 is wholly or partly made of an electrically insulated material in order to prevent flow of electricity through the cutter 134 when the cutter 134 is in the second cutter position (FIG. 8.). Accordingly, when the cutter 134 is in the second cutter position (FIG. 8) relative to the case 102, the insulator 164 is substantially aligned with the access opening 112, thereby preventing the flow of electricity through the cutter 134 after the electrical conductor 17 has been cut.

With reference to FIGS. 1, 4, and 8, in operation, the power cut off device 100 can cut the electrical conductor 17 after an external force F has been applied to the vehicle 10, thereby cutting electrical power in the vehicle 10. As discussed above, the sensor 24 can detect whether an external force F has been applied to the vehicle 10. The SDM 18 is programmed to receive an activation signal to the sensor 24 when the external force F is applied to the vehicle 10. Upon receipt of the activation signal, the SDM 18 generates an actuation signal and sends this actuation signal to the actuator 128 via the connector 136. The connector 136 electrically connects the SDM 18 to the actuator 128. When the actuator 128 receives the actuation signal from the SDM 18, the driver 132 (e.g., push rod) moves relative to the case 102 from the first driver position (FIG. 4) toward the second driver position (FIG. 8), thereby moving the cutter 134 from the first cutter position (FIG. 4) toward the second cutter position (FIG. 8). As the cutter 134 moves along the case axis Y, the cutting edges 162 (FIG. 5) cut the electrical conductor 17 disposed in the access opening 112 of the case 102, discontinuing the flow of electrical energy through the electrical conductor 17. When the cutter 134 is in the second cutter position (FIG. 8), the insulator 164 also prevents the flow of electricity through the cutter 134.

While the best modes for carrying out the teachings have been described in detail, those familiar with the art to which this disclosure relates will recognize various alternative designs and embodiments for practicing the teachings within the scope of the appended claims.

The invention claimed is:

1. A power cut off device, comprising:
   a case defining an access opening;
   an actuator disposed in the case and including a driver, wherein the driver is movable relative to the case between a first driver position and a second driver position;
   a cutter movably disposed in the case, wherein the cutter defines a conductor receiving opening and is movable relative to the case between a first cutter position and a second cutter position; and
   an insulator block disposed inside the cutter;
   wherein the cutter is operatively coupled to the actuator such that the driver is configured to drive the cutter from the first cutter position to the second cutter position when the driver moves from the first driver position to the second driver position in order to cut an electrical conductor disposed in the conductor receiving opening; and
   wherein the insulator block is at least partially aligned with the access opening when the cutter is in the second cutter position.

2. The power cut off device of claim 1, wherein the actuator includes a cylinder, and the driver is a push rod movably coupled to the cylinder.

3. The power cut off device of claim 2, wherein the actuator is a pyrotechnic actuator.

4. The power cut off device of claim 1, wherein the cutter has cutting edges defining the conductor receiving opening.

5. The power cut off device of claim 4, wherein the conductor receiving opening is aligned with the access opening when the cutter is in the first cutter position.

6. The power cut off device of claim 1, further comprising a connector configured to electrically connect the actuator to a sensing diagnostic module.

7. The power cut off device of claim 1, wherein the case at least partially surrounds the cutter such that the cutter is slidable relative to the case.

8. The power cut off device of claim 7, wherein the case supports the cutter such that the cutter is linearly movable relative to the case.

9. The power cut off device of claim 1, wherein the conductor receiving opening has a substantially circular portion in order to receive the electrical conductor.

10. A power cut off system for a vehicle, comprising:
an electrical conductor;
a sensor configured to detect if an external force has been applied to the vehicle;
a sensing diagnostic module (SDM) in electronic communication with the sensor, wherein the SDM is specifically programmed to:
receive an activation signal from the sensor when the external force is applied to the vehicle; and
generate an actuation signal upon receipt of the activation signal from the sensor;
a power cut off device in electronic communication with the SDM such that the power cut off device is configured to receive the actuation signal from the SDM, wherein the power cut off device includes:
a case defining an access opening;
an actuator disposed in the case and including a driver, wherein the driver is movable relative to the case between a first driver position and a second driver position, and the actuator is in electronic communication with the SDM such that the driver is configured to move from the first driver position to the second driver position when the actuator receives the actuation signal from the SDM;
a cutter defining a conductor receiving opening, the cutter being movably disposed in the case such that the cutter is movable relative to the case between a first cutter position and a second cutter position;
an insulator block disposed inside the cutter;
wherein the cutter is operatively coupled to the actuator such that the driver is configured to drive the cutter from the first cutter position to the second cutter position when the driver moves from the first driver position to the second driver position in order to cut the electrical conductor disposed in the conductor receiving opening; and
wherein the insulator block is at least partially aligned with the access opening when the cutter is in the second cutter position.

11. The power cut off system of claim 10, wherein the SDM is programmed to send the actuation signal to the actuator when the SDM receives the activation signal from the sensor.

12. The power cut off system of claim 10, wherein the sensor is a deceleration sensor configured to measure a deceleration magnitude of the vehicle.

13. The power cut off system of claim 12, wherein the SDM is programmed to send the actuation signal to the actuator when the deceleration magnitude is greater than a deceleration threshold.

14. The power cut off system of claim 13, wherein the sensor is a g-force sensor configured to measure a g-force acting on the vehicle.

15. The power cut off system of claim 14, wherein the SDM is programmed to send the actuation signal to the actuator when the g-force acting on the vehicle is greater than a force threshold.

16. The power cut off system of claim 10, wherein the actuator includes a cylinder, and the driver is a push rod movably coupled to the cylinder.

17. The power cut off system of claim 16, wherein the actuator is a pyrotechnic actuator, the cutter includes a cutter body, the cutter body is hollow, an entirety of the cutter is disposed inside the case to guide a liner movement of the cutter relative to the case, the cutter body includes a first cutter wall and a second cutter wall opposite the first cutter wall, the cutter body includes a third cutter wall coupled between the first cutter wall and the second cutter wall, the cutter body includes a fourth cutter wall opposite the third cutter wall, the third cutter wall is directly coupled to the first cutter wall, the third cutter wall is directly coupled to the second cutter wall, the fourth cutter wall is coupled between the first cutter wall and the second cutter wall, the fourth cutter wall is directly coupled to the first cutter wall, the fourth cutter wall is directly coupled to the second cutter wall, the cutter body includes a fifth cutter wall directly interconnecting the first cutter wall, the second cutter wall, the third cutter wall, and the fourth cutter wall, the cutter body includes a sixth cutter wall opposite the fifth cutter wall, the sixth cutter wall directly interconnects the first cutter wall, the second cutter wall, the third cutter wall, and the fourth cutter wall, the conductor receiving opening extends through the cutter body, the conductor receiving opening extends through the first cutter wall, the third cutter wall, and the fourth cutter wall, and the conductor receiving opening does not extend through the second cutter wall.

18. The power cut off system of claim 17, wherein the case has an elongated shape, the case is hollow, the case includes a first case wall and a second case wall opposite the first case wall, the case includes a third case wall coupled between the first case wall and the second case wall, the third case wall is directly coupled to the first case wall, the third case wall is directly coupled to the second case wall, the case includes a fourth case wall opposite the third case wall, the fourth case wall is coupled between the first case wall and the second case wall, the fourth case wall is directly coupled to the first case wall, the fourth case wall is directly coupled to the second case wall, the case extends along a case axis, the access opening extends through the first case wall, the third case wall, and the fourth case wall, the access opening does not extend through the second case wall, the access opening extends along an opening axis, the opening axis is perpendicular to the case axis, the access opening includes a first access portion and a second access portion connected to the first access portion, the first access portion is closer to the first case wall than to the second case wall, the first access portion has a rectangular cross-section, the second access portion is closer to the second case wall than to the first case wall, the second access portion has a circular cross-section, the case has a fifth case wall directly interconnecting the first case wall, the second case wall, the third case wall, and the fourth case wall, the fifth case wall defines a first end of the case, the case defines a first relief opening extending through the first case wall, the case includes a sixth case wall, the sixth case wall directly interconnecting the first case wall, the second case wall, the third case wall, and the fourth case wall, the sixth case wall is opposite the fifth case wall, the sixth case wall defines a second end of the case, the power cut off system includes a cap coupled to the sixth case wall, and the cap defines a second relief opening.

19. The power cut off system of claim 18, wherein a shape and a size of the conductor receiving opening match a shape and size of the access opening, respectively, the conductor receiving opening includes a first receiving portion and a second receiving portion connected to the first receiving portion, a shape and a size of the first receiving portion match a shape and a size of the first access portion, respectively, the first receiving portion has a rectangular cross-section, the cutter body has blunt inner surfaces, the blunt inner surfaces define the first receiving portion, a shape and a size of the second receiving portion match a shape and a size of the second access portion, respectively, the second receiving portion has a circular cross-section, the cutter body has sharp cutting edges, the sharp cutting edges define the second receiving portion, the insulator block is entirely made of an electrically insulating material, and the insulator block is entirely disposed inside the cutter body.

* * * * *